(12) United States Patent
Lal et al.

(10) Patent No.: US 8,225,092 B2
(45) Date of Patent: Jul. 17, 2012

(54) ACCESS AUTHENTICATION METHOD SUITABLE FOR THE WIRE-LINE AND WIRELESS NETWORK

(75) Inventors: Xiaolong Lal, Xi'an (CN); Jun Cao, Xi'an (CN); Hong Guo, Xi'an (CN); Zhenhai Huang, Xi'an (CN); Bianling Zhang, Xi'an (CN)

(73) Assignee: China Iwncomm Co., Ltd. (CN)

( * ) Notice: Subject to any disclaimer, the term of this patent is extended or adjusted under 35 U.S.C. 154(b) by 696 days.

(21) Appl. No.: 11/816,743

(22) PCT Filed: Feb. 21, 2006

(86) PCT No.: PCT/CN2006/000249
§ 371 (c)(1),
(2), (4) Date: Sep. 2, 2009

(87) PCT Pub. No.: WO2006/086932
PCT Pub. Date: Aug. 24, 2006

(65) Prior Publication Data
US 2011/0055561 A1    Mar. 3, 2011

(30) Foreign Application Priority Data
Feb. 21, 2005    (CN) .......................... 2005 1 0041714

(51) Int. Cl.
*H04L 29/06* (2006.01)
(52) U.S. Cl. ........ 713/168; 713/169; 713/170; 713/171; 713/172; 713/174; 726/3; 726/4; 726/5; 726/6; 726/7
(58) Field of Classification Search .................. 713/168
See application file for complete search history.

(56) References Cited

U.S. PATENT DOCUMENTS

| | | |
|---|---|---|
| 2003/0051140 A1 | 3/2003 | Buddhikot |
| 2003/0226017 A1 | 12/2003 | Palekar |
| 2007/0250713 A1* | 10/2007 | Rahman et al. ............... 713/171 |

FOREIGN PATENT DOCUMENTS

| | | |
|---|---|---|
| CN | 1510862 | 7/2004 |
| JP | 2004072631 | 3/2004 |
| WO | 02058357 | 7/2002 |

OTHER PUBLICATIONS

International Search Report dated Jun. 8, 2006.

(Continued)

*Primary Examiner* — Longbit Chai
(74) *Attorney, Agent, or Firm* — Carlson, Gaskey & Olds, P.C.

(57) ABSTRACT

An access authentication method includes pre-establishing a security channel between the authentication server of the access point and the authentication server of the user terminal and performing the authentication process at user terminal and access point. The authentication process includes 1) the access point sending the authentication_activating message; 2) the user terminal sending the authentication server of user terminal request message; 3) the authentication server of the user terminal sending to the user terminal response message; and 4) completing the authentication.

8 Claims, 2 Drawing Sheets

OTHER PUBLICATIONS

LAN/MAN Committee, Part 11: Wireless LAN Medium Access Control (MAC) and Physical Layer (PHY) Specifications, Amendment 6: Medium Access Control (MAC) Security Enhancements, Jul. 23, 2004, pp. 1-190, Institute of Electrical and Electronic Engineers, Inc., New York, New York.

LAN/MAN Standards Committee, Part 11: Wireless LAN Medium Access Control (MAC) and Physical Layer (PHY) Specifications, Aug. 20, 1999, pp. 1-528, Institute of Electrical and Electronic Engineers, Inc., New York, New York.

Louis Mamakos, Kurt Lidl, Jeff Evarts, David Carrel, Dan Simone, Ross Wheeler, A Method for Transmitting PPP Over Ethernet (PPPoE), Feb. 1999, pp. 1-10.

Traffic Models for IEEE 802.20 MBWA System Simulations, Jul. 8, 2003, pp. 1-14.

LAN/MAN Standards Committee, Port Based Network Access Control, Jul. 13, 1999, pp. 1-142, Institute of Electrical and Electronics Engineers, Inc., New York, New York.

LAN/MAN Standards Committee, Part 16: Air Interface for Fixed and Mobile Broadband Wireless Access Systems, Amendment for Physical and Medium Access Control Layers for Combined Fixed and Mobile Operation in Licensed Bands, Published 2003, pp. 1-660, Institute of Electrical and Electronics Engineers, Inc., New York, New York.

LAN/MAN Standards Committee, IEEE Standard for Local and Metropolitan Area Networks, Part 16: Air Interface for Fixed Broadband Wireless Access Systems, Published Oct. 1, 2004, pp. 1-895, Institute of Electrical and Electronics, Inc., New York, New York.

Extended European Search Report dated Oct. 7, 2009.

\* cited by examiner

ACCESS AUTHENTICATION METHOD SUITABLE FOR THE WIRE-LINE AND WIRELESS NETWORK

RELATED APPLICATIONS

The application is the National Stage application of PCT Application No. PCT/CN2006/000249 filed on Feb. 21, 2006, which claims priority to Chinese Application No. 200510041714.8 filed on Feb. 21, 2005.

BACKGROUND OF THE INVENTION

The present invention relates to a network technology, particularly to an access authentication method suitable for wired and wireless networks.

To date, there are a variety of networks available that provide resources in various ways for users to use. In terms of physical media, the mode of network access includes ADSL, HomePNA, Cable Modem, VDSL and Ethernet. Of them the Ethernet, being inexpensive and having broader band, has gradually become the main mode of broadband network access, and ADSL, making use of the available telephone lines, has become the main mode of network access for users living in residential areas and working in small/home offices. There are these forms of wireless network accesses, such as IEEE 802.11 for wireless LAN, IEEE 802.16 for broadband wireless access, IEEE 802.20 for mobile broadband wireless access, GSM global mobile communication system, and the 3G mobile communication.

Any network accessing, be it a wired or wireless network access, requires a method of authentication between users and the network. Every mode of access provides its own method of authentication, and these methods have something in common, and are different from one another as well.

There are mainly three methods of user authentication in the available broadband wired access: PPPoE, Web/Portal and 802.1x. They are all one-way authentication that is, authenticating the users only, and the users unconditionally trust the network. The user's trust in a network is ensured through physical line connection. However, in the authentication methods of PPPoE and 802.1x, the Extensible Authentication Protocol (EAP) authentication method has begun to be used to support a two-way authentication.

At present, the link encryption methods are not used in wired access networks. Of these methods, the Web/Portal authentication method cannot produce a session key, nor does it support the binding of the user and session key, and link encryption. By contrast, the PPPoE and 802.1x authentication methods both support the link encryption, but they are usually not used.

The security is a far more serious matter in a wireless network than in a wired network, and all sorts of wireless technologies use authentication and link encryption to achieve security.

IEEE 802.11 initially used the authentication and encryption method based on the statically shared key + the Wired Equivalent Privacy (WEP), and IEEE 802.16 used a one-way authentication method based on public-key authentication. Neither of the methods is now adaptable to the present needs. Now, IEEE 802.11 has adopted new security methods: WiFi Protected Access (WPA)/IEEE 802.11i and WLAN Authentication and Privacy Infrastructure (WAPI). Besides, IEEE 802.16 has also set up a new working group IEEE 802.16e to improve the former IEEE 802.16 technology, the security method included.

WPA/802.11i uses the 802.1x+EPA security technology; the WAPI security system uses the public key technology, the authentication server in the WAPI is used for authentication and management of certificates. Both a mobile terminal and wireless access point are provided public-key certificates issued by the identification server, as a proof of its own digital identity. When a mobile terminal logs onto a wireless access point, the two must check each other's identity with the authentication server.

As for the IEEE 802.16e, its draft form is now still under discussion. Its authentication method, representing an improvement of IEEE 802.16, supports a two-way authentication, but its specific method to be used is now still under discussion.

GSM is a second-generation mobile communication technology, adopting an symmetrical key based one-way authentication technology. 3G is a third generation mobile communication technology whose authentication technology represents an improvement of the authentication technology of GSM and supports the two-way authentication.

As the foregoing analysis shows, for both wired and wireless network, authentication is quite necessary. The ongoing trend is that a user uses different network access mode to visit network resources, but he hopes to use one identity for authentication. Using one identity for authentication will require convergence of the authentication methods, which poses new demand to the authentication methods now in existence. For that reason, it is very necessary to integrate the authentication methods now in use and establish an authentication method suitable for wired and wireless networks.

However, all the above-mentioned authentication methods are not suitable for meeting the demand for authentication with one identity. The symmetric-key-based authentication methods represented by GSM/3G are so complicated in their key management that it is very difficult to meet the requirement of a user to access several networks with just one identity. The IEEE 802.16 authentication method relies on the Public Key Infrastructure (PKI) system. A difficulty exists with the application of the PKI technology to an access system: since the PKI technology implies distributive accesses, a user may access a plurality of indefinite resources. In its access system, however, before the authentication successes, the user terminal is not allowed to access the resources, or is just allowed to access limited or definite resources. This makes it possible only for the authentication method of IEEE 802.16 to achieve one-way authentication.

The 802.1x+EAP authentication methods as represented by IEEE 802.11i supports the symmetrical key_and public key authentication method. Said method is one in which the authentication server carries on key negotiation directly with a user terminal, then, the authentication server sends to the access point the key derived from the negotiation, and the user terminal and the access point carry on the authentication and session key negotiation based on the dynamically shared key with each other. The authentication technology, now widely applied, is a relatively mature technology, but it still has its own problems:

1. The structure of IEEE 802.1x is not a symmetrical one. The user terminal and access point differ considerably in function. The user terminal does not have the terminal control function, while the access point does not have the authentication function, so authentication is performed between the user terminal and authentication server. While the authentication server may be implemented in the same system with the access point, this will greatly reduce the advantage of IEEE 802.1x in centralized control of the access points.

2. The extensibility is poor. Between each access point and authentication server there is a pre-defined security tunnel. The more security tunnel, the more resources of the authentication server system will be consumed, the more complicated the management is; hence it is not advisable to arrange a large number of security tunnels, otherwise, the network extensibility would be limited.

3. The key negotiation process is complicated. A key is used for protecting data between the user terminal and access point, but negotiation is first required between the user terminal and authentication server and then between the user terminal and access point.

4. New attack point is to be introduced, with lowered security. The main key derived from negotiation between a user terminal and authentication server is transmitted to an access point by the authentication server. With the key passing on the network, new security attack points are introduced.

5. Authentication terminal does not have an independent identity. For a user terminal, the identities of the authentication terminal managed by the same authentication server are indistinguishable. Extra functional entities have to be added in the application environment where it is necessary to distinguish one identity from another. This would make things more complicated.

As the above analysis shows, the existing access authentication methods cannot meet our needs.

SUMMARY OF THE INVENTION

The present invention is to provide an access authentication method suitable both for wired and wireless networks, and to solve the existing technical problem of the impossibility for a network user to use one identity to access several networks.

The network structure which the present invention is based on is shown in FIG. 1, in which User is the user terminal, AP is the access point, F-AS and H-AS are respectively the authentication server of the access point and that of the user terminal. The user terminal User and the access point AP both have their respective public-key certificate issued by their respective authentication server and the corresponding private key. In the Fig., the broken lines show the logic security connections, and the solid lines the actual physical connections. Between the authentication server H-AS of the user terminal and the authentication server F-AS of the access point there exists the security channel A_<F-AS, H-AS>. They have mutual trust. When unknown network is to be crossed between F-AS and H-AS, uncontrollable security-threatening factors increases; hence, a security channel is pre-established between them to protect messages. Since one F-AS has to manage many APs and these APs belong to one management zone, out of consideration for extensibility, a security channel is not pre-established between the F-AS and AP, and the security of the messages transmitted between them is ensured under the authentication protocol.

The technical solution of the present invention is an access authentication method suitable for wired and wireless networks, comprising the following steps:

1) Establishing a security channel: a security channel is pre-established between the authentication server F-AS of the access point and the authentication server H-AS of the user terminal to protect messages;

2) Conducting the process of authentication at the user terminal and access point, and completing their mutual identity authentication specifically as follows:

2.1) the access point sends the authentication_activating message: the access point sends to the user terminal the authentication_activating message containing authentication challenge $N_{CH}$;

2.2) the user terminal sends the authentication server of user terminal request message, specifically as follows:

2.2.1) the user terminal sends the access_authentication_request message: after receiving the authentication_activating message, the user terminal sends the access point the access_authentication_request message containing authentication challenge $N_{CH}$ which the user terminal has received, user terminal certificate $Cert_u$ and the user terminal's random number Nu, and the signature on said content by the user terminal;

2.2.2) The access point sends the identification_request message: after the access point receives the access_authentication_request message, if the authentication challenge $N_{CH}$ it has received and the authentication challenge $N_{CH}$ it has sent out are identical and the signature is correct upon checking according to the user terminal's certificate, the access point then sends the authentication server of the access point the identification_request message containing the certificate $Cert_u$ of the user terminal, certificate $Cert_{AP}$ of the access point, and the random number $N_{AP}$ of the access point, the user terminal random number $N_u$, and the signature on said content by the access point; if the authentication challenge $N_{CH}$ it has received and the authentication challenge $N_{CH}$ it has sent out are not identical, the access point stops the authentication process;

2.2.3) The authentication server of the access point sends the roaming_identification_request message:

after receiving the identification_request message, the authentication server of the access point checks the signature of the access point according to the certificate of the access point, constructs, according to the check result, the initial certificate check result $RES_{AP}$ of the access point. Said initial certificate check result includes the certificate of the access point and the valid status information of its certificate; determines, according to the certificate of the user terminal, the location of the authentication server of the user terminal, constructs and sends to the authentication server of the user terminal the roaming_identification_request message containing the initial certificate check result of the access point, random number $N_u$ of the user terminal, and certificate $Cert_u$ of the user terminal;

2.3) The authentication server of the user terminal sends the response message to the user terminal 2.3.1) The authentication server of the user terminal sends roaming_identification_response message:

after receiving the roaming_identification_request message, the authentication server of the user terminal checks the certificate of the user terminal, constructs, according to the check result, the user terminal's initial certificate check result $RES_u$ including the certificate of the user terminal and the valid status information of its certificate; then generates the access point's final certificate check result including the initial certificate check result $RES_u$ of the user terminal, the initial certificate check result $RES_{AP}$ of the access point, random number Nu of the user terminal and the signature $Sig_{H-AS}$ of the authentication server of user terminal on said contents; the authentication server of the user terminal constructs and sends to the authentication server of the access point the roaming_identification_response message including the initial certificate check result of the user terminal, attribute of the user terminal, and the final certificate check result of the access point.

2.3) The authentication server of access point sends the identification_response message:

2.3.1) after receiving the roaming_identification_response message, the authentication server of the access point generates the user terminal's final certificate check result including the user terminal's initial certificate check result $RES_u$, access point's initial certificate check result $RES_{AP}$, the access point's random number $N_{AP}$ and the signature $Sig_{F-AS}$ of the authentication server of the access point on said contents; the authentication server of the access point constructs and sends to the access point the identification_response message containing the final certificate check result of the user terminal and the final certificate check result of the access point;

2.3.2) The access point sends the authentication_response message: after receiving the identification_response message, the access point sends the user terminal the authentication_response message containing the final certificate check result of the access point. It then checks the final certificate check result of the user terminal. If the final certificate check result of the user terminal is legitimate, the access point continues to carry on the next-step communication with the user terminal, otherwise, the access point stops the authentication process.

2.3.3) Authentication is completed: after the user terminal receives message, if the final certificate check result of the access point is legitimate, the authentication is completed. The user terminal continues to carry on the next-step communication with the access point, otherwise, the user terminal stops the authentication process.

2.4) Said steps of authentication by the user terminal and access point include the step to determine the method adopted during the key negotiation between the two:

1) The authentication_activating message which the access point sends to the user terminal contains the type of key negotiation method supported by the access point;

2) The access_authentication_request message that the user terminal sends to the access point contains the type of key negotiation method chosen by the user terminal, and the chosen type is signed by the user terminal.

Said steps of authentication by the user terminal and access point include determining the types of the authentication methods adopted by the two:

1) The authentication_activating message which the access point sends to the user terminal contains the types of authentication methods supported by the access points;

2) The access_authentication_request message that the user terminal sends to the access point contains the types of authentication methods chosen by the user terminal. The chosen authentication method type shows the authentication method adopting the present invention and signed by the user terminal;

3) Said identification_request message, roaming_identification_request message, roaming_identification_response message, identification_response message and authentication_response message all contain the types of authentication methods chosen by the user terminal. The type of the chosen authentication method in the identification_request message is signed by the access point.

Said roaming_identification_request message includes the attributes $ATT_{AP}$ of the access point; said roaming_identification_response message includes the attributes ATTu of the user terminal; said final certificate check results of the access point include the user terminal's initial certificate check result RESu, access point's initial certificate check result $RES_{AP}$, user terminal's random number Nu, access point's attribute $ATT_{AP}$ and the signature $Sig_{H-AS}$ on said contents by the authentication server of the user terminal; said final certificate check results of the user terminal include the user terminal's initial certificate check result RESu, access point's initial certificate check result $RES_{AP}$, access point's random number $N_{AP}$, user terminal's attribute ATTu, and the signature $Sig_{F-AS}$ on said contents on the authentication server of the access point;

Said method includes the process of key negotiation between the user terminal and access point after they complete the authentication process:

1) The access point sends key_negotiation_challenge message: the access point generates, according to the identity of the user terminal and access point, the security index $SPI_{AP}$ of the access point, and simultaneously generates random number N1, and sends to the user terminal the key_negotiation_challenge message containing the security index $SPI_{AP}$ and the random number N1;

2) The user terminal sends key_negotiation_request message: after receiving the key_negotiation_challenge message, the user terminal generates, according to the identity of the user terminal and access point, security index SPIu, and then checks whether $SPI_{AP}$ and $SPI_U$ are consistent or not. If they are, it then generates random number $N_{KEY}$ as the shared secret, and uses public key encryption $N_{KEY}$ of the access point to generate the key negotiation information; after that, the user terminal constructs and sends to the access point the key_negotiation_request message containing the user terminal's security index $SPI_U$, key negotiation information, random number N1 and the signature on said information by user terminal;

3) The access point sends key_negotiation_response message:

after receiving the key_negotiation_request message, the access point verifies that the user terminal's signature is correct, then uses the access point's private key for decryption to obtain $N_{KEY}$; checks whether $SPI_{AP}$ and $SPI_U$ are consistent or not and whether the received random number N1 and that it sends in the key_negotiation_challenge message are consistent or not. If they are all consistent, it uses the key to generate function f ($N_{KEY}$, N1, $SPI_{AP}$, "lexical string") to compute every key, including the data unicast key UK, HMAC key and the unicast/group key encryption key KK; the access point generates group key GK, set, according to the system status, group data serial number SN and group key notification serial number GN, and then the access point uses unicast/group key encryption key KK to encrypt group key GK, and sends it to the user terminal together with the access point's security index $SPI_{AP}$, group data serial number SN, group key notification serial number Gn, and their HMAC value as the key_negotiation_response message.

4) The user terminal sends key_negotiation_confirmation message: after receiving the message, the user terminal checks whether $SPI_{AP}$ and $SPI_U$ are consistent or not. If they are, it uses the key to generate function f ($N_{KEY}$, N1, $SPI_U$, "lexical string") to compute every key, including the data unicast key UK, HMAC key and the unicast/group key encryption key KK; after it is verified that the correct HMAC value is received, uses the unicast/group key encryption key KK for decryption to obtain the group key GK, and then sends to the access point the user terminal's security index $SPI_U$, group data serial number SN, group key notification serial number Gn, and their HMAC value as the key_negotiation_confirmation message. The user terminal opens the controlled port, and allows communication with the access point;

5) The key negotiation is completed: after receiving the message, the access point checks whether $SPI_{AP}$ and $SPI_U$ are consistent or not. If they are, then checks that the group data serial number SN, group key notification serial number Gn and HMAC value are correct, and, after that, it opens the controlled port, and allows communication with the user terminal.

Said method includes the process of updating unicast key performed by the user terminal and access point:

1) The user terminal sends unicast key_updating_request message: the user terminal initiates unicast key updating, it produces a new unicast key UK, produces random number as challenge Nonce, chooses a fresh unicast key updating serial number Un, uses unicast/group key encryption key KK to encrypt UK, and passes it onto the access point together with the user terminal's security index $SPI_U$, encrypted unicast key UK, unicast key updating serial number Un, challenge Nonce and their HMAC value as the unicast key_updating_request message;

2) The access point sends unicast key_updating_response message: after receiving the message, the access point checks whether $SPI_{AP}$ and SPIu are consistent or not, if they are, decrypts, after verifying that the unicast key updating serial number Un is fresh and the HMAC value correct, to obtain a new unicast key UK, then uses the new unicast key UK to encrypts challenge Nonce; and sends it to the user terminal together with the access point's security index $SPI_{AP}$, unicast key updating serial number Un and their HMAC value as the unicast key_updating_response message;

3) The user terminal installs new unicast key: after receiving the message, the user terminal checks whether $SPI_{AP}$ and $SPI_U$ are consistent or not, it they are, verifies that the unicast key updating serial number Un is identical with the value it sends, and decrypts, after verifying that the HMAC value is correct, decrypts to obtain Nonce, makes comparison to find out whether said Nonce is consistent with the Nonce it sends in the unicast key_updating_request message. If it is, the user terminal then installs a new unicast key; and if any said comparison or verification fails to pass, it repeats the unicast key updating process.

Said unicast key updating can be initiated by the access point.

Said method includes the group key notification process performed by the user terminal and access point:

1) The access point sends group_key_notification message: the access point produces a new group key GK, sets, according to the status of the system, the multicast data serial number SN and a fresh group key notification serial number Gn, uses unicast/group key encryption key KK to encrypt the group key GK, and sends it to the user terminal together with multicast data serial number SN, group key notification serial number Gn, and their HMAC value as the multicast_key_notification message;

2) The user terminal sends multicast_key_confirmation message: after receiving the message, the user terminal verifies whether the group cast key notification serial number Gn is fresh and the HMAC value correct, then uses unicast/group key encryption key KK for decryption to obtain and installs group key GK, and sends to the access point the multicast data serial number SN, group key notification serial number Gn, and their HAMC value as the group_key_confirmation message;

3) The group key notification is completed: after receiving the message, the access point verifies whether the group key notification serial number Gn and multicast data serial number SN are consistent with what it sends itself; if they are and if the HMAC value is verified to be correct, the notification is over.

The present invention has the following advantageous.

1. The method of the present invention, which is applicable to all network environments, can use the same authentication process, so that it meets the requirements for a network user to access a plurality of networks with one identity;

2. The method of the present invention adopts the idea of modules design and separates the authentication process from the key negotiation process, meets the requirement of without encryption under some network environment, and the two processes may be separately improved or substituted, so it is highly flexible;

3. The unicast key updating process is independent from the key negotiation process, and use of a different key negotiation process does not affect the unicast key updating process.

4. The present invention adopts the idea of equivalence, gives the access point its independent identity, makes the access point itself distinguishable, removes the substantial dependence between the access point and local authentication server, so as to have dissolved the need for a strong security association between the access point and the local authentication server, and enhanced extensibility;

5. The key negotiation is directly performed between the user terminal and access point, thus improving the performance and enhancing security.

BRIEF DESCRIPTION OF THE DRAWINGS

FIG. 1 is a view showing the network structure which the method of the present invention is based on.

DETAILED DESCRIPTION OF THE PREFERRED EMBODIMENT

Figure 1:
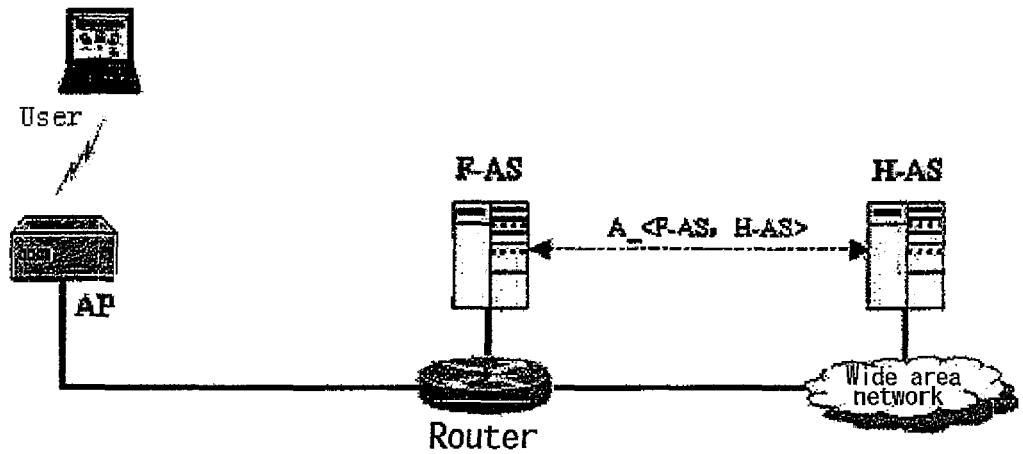
Figure 2:
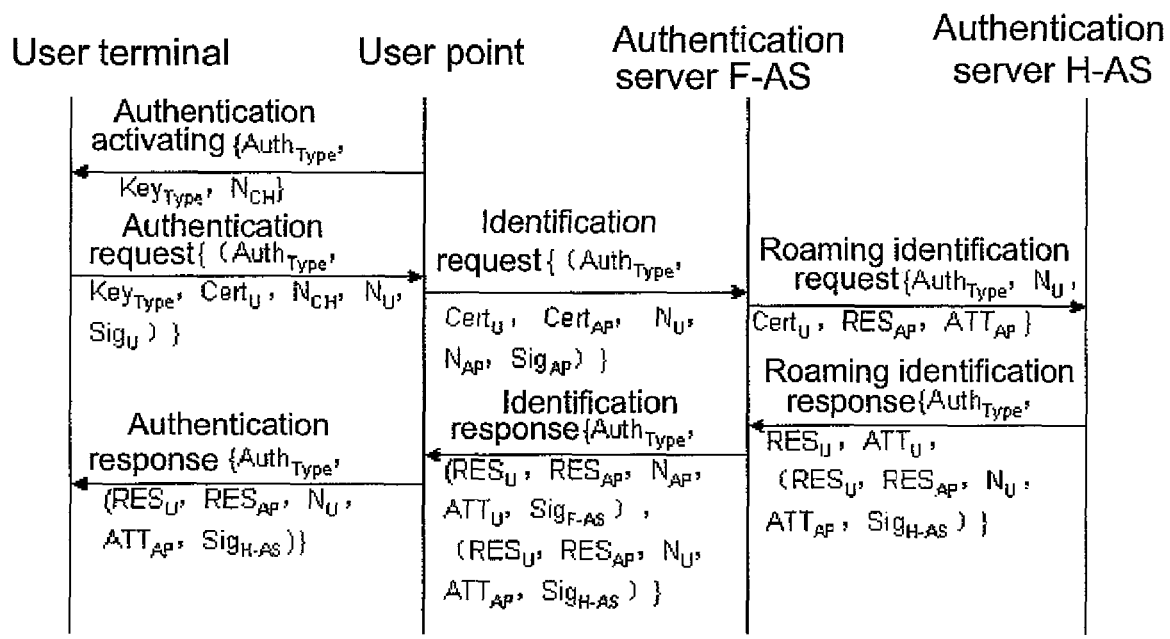
FIG. 2 is a view showing the authentication process of the present invention.

The present invention provides an access authentication method suitable for wired and wireless networks as specifically shown below:

The security signal channel A-<F-AS, H-AS> exists between the authentication server H-AS of the user terminal and the authentication server F-AS of the access point, and the two servers have mutual trust in each other. When unknown network is to be crossed over between F-AS and H-AS, uncontrollable security-threatening factors increases; hence, a security channel is pre-established between them to protect messages. Since one F-AS has to manage many APs belonging to the same management zone as it, in view of the extensibility, a security signal channel is not pre-established between the F-AS and AP, and the security of the messages transmitted between them is ensured under the authentication protocol 1. The user terminal and access point perform the authentication process to complete their mutual identity authentication and determine the method adopted for the key negotiation between them in a way specifically shown in FIG. 2 as follows:

1.1) The access point sends to the user terminal the authentication_activating message containing the types of authentication supported by the access point, type of Key negotiation, and the authentication challenge $N_{CH}$;

1.2) After receiving the authentication_activating message, the user terminal sends to the access point the access_authentication_request message containing the type of authentication and the type of key negotiation chosen by the user terminal and the corresponding data content, and the signature on said contents by user terminal. The chosen authentication type shows the authentication method adopting the present invention, and the data content includes the received authentication challenge $N_{CH}$, the user terminal's certificate $Cert_u$, and the user terminal's random number Nu;

1.3) After the access point receives the access_authentication_request message, if the authentication challenge $N_{CH}$ it has received and the authentication challenge $N_{CH}$ it has sent out are identical and the signature is correct upon checking according to the certificate of the user terminal, the access point then sends to the authentication server of the access point the identification_request message containing type of authentication chosen by the user terminal, the certificate $Cert_u$ of the user terminal, the certificate $Cert_{AP}$ of the access point, and the random number $N_{AP}$ of the access point, user terminal's random number $N_u$, and the access point's signature on said content; otherwise, the access point stops the authentication process;

1.4) After the authentication server of the access point receives the message, it checks the signature by the access point according to the certificate of the access point, constructs, according to the check result, the initial certificate check result $RES_{AP}$ of the access point, {the certificate of the access point and information of the valid status of the access point's certificate}. It determines, according to the identity of the user terminal obtained from the certificate, the location of authentication server of the user terminal, constructs the roaming_identification_request message, and sends it to the authentication server of the user terminal. The message contains the type of authentication, the initial certificate check result of the access point, the attributes $ATT_{AP}$ of the access point (it may, depending on needs, contain the corresponding information, e.g. public-key certificate the access point uses for the encryption), the user terminal's random number $N_u$, and the certificate $Cert_u$ of the user terminal;

1.5) After receiving the message, the authentication server of user terminal checks the certificate of the user terminal, constructs, according to the check result, the user terminal's initial certificate check result $RES_u$ {the certificate of the user terminal and valid status information of its certificate}. It then generates the access point's final certificate check result $\{RES_U, RES_{AP}, Nu, ATT_{AP}, Sig_{H-AS}\}$. In the authentication server of the user terminal is kept the user terminal's attribute ATTu, the content of the attribute may be configured depending on the application circumstances. The authentication server of user terminal sends to the authentication server of the access point the roaming_identification_response message including the type of certificate, the initial certificate check result of the user terminal, the attribute of the user terminal, and the access point's final certificate check result;

1.6) After receiving the message, the authentication server of the access point generates the user terminal's final certificate check result $\{RES_U, RES_{AP}, N_{ap}, ATT_u, Sig_{F-AS}\}$. The authentication server of the access point sends to the access point the identification_response message including the type of certificate, the final certificate check result of the user terminal, and the access point's final certificate check result;

1.7) After receiving the message, the access point sends to the user terminal the authentication_response message containing the type of authentication and the final certificate check result of the access point. It then checks the final certificate check result of the user terminal. If the final certificate check result of the user terminal is legitimate, the access point continues to carry on the next-step communication with the user terminal, otherwise, the access point stops the authentication process. If the key negotiation process is not to be performed after the authentication process, then the access point opens the controlled port; otherwise it does not open it;

1.8) After the user terminal receives message, if the final certificate check result of the access point is legitimate, the user terminal continues to carry on the next-step communication with the access point, otherwise, the user terminal stops the authentication process. If the key negotiation process is not to be performed after the authentication process, then the user terminal opens the controlled port; otherwise it does not open it.

Figure 3:
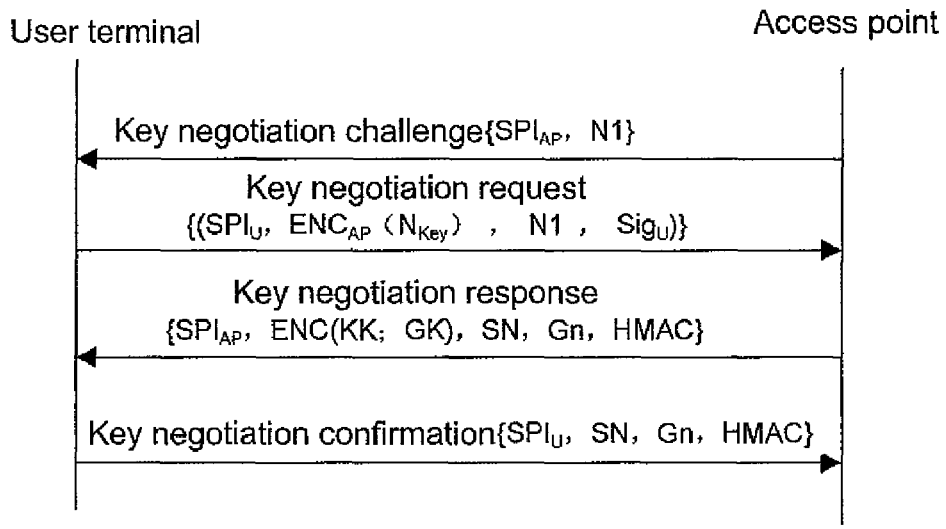
FIG. 3 is a view showing the key negotiation process of the present invention.

2. After the user terminal and access point complete the authentication process, they perform and complete the key negotiation process. See FIG. 3 for the specific details as shown below.

2.1) The access point generates, according to the identities of the user terminal and access point, security index $SPI_{AP}$ of the access point, and simultaneously generates random number N1, sends to the user terminal the key_negotiation_challenge message containing security index $SPI_{AP}$ and random number N1;

2.2) After receiving the message, user terminal generates, according to the identities of the user terminal and access point, security index SPIu, and then checks whether $SPI_{AP}$ and $SPI_U$ are consistent or not. If they are, it then generates random number $N_{KEY}$ as shared secret, and uses public key encryption $N_{KEY}$ of the access point to generate the key negotiation information; after that, the user terminal signs on the user terminal's security index $SPI_U$, random number $N_1$ and the key negotiation information, and the user terminal passes to the access point the signed key_negotiation_request message containing the user terminal's security index $SPI_U$, key negotiation information, and random number N1;

2.3) After receiving the message, the access point verifies that the user terminal's signature is correct. After that, it uses the access point's private key for decryption to obtain $N_{KEY}$; checks whether $SPI_{AP}$ and $SPI_U$ are consistent or not and whether the received random number N1 and that it sends in the key_negotiation_challenge message are consistent or not. If they are all consistent, it uses the key to generate function $f(N_{KEY}, N1, SPI_{AP},$ "lexical string") to compute every key, including the data unicast key UK, HMAC key and the unicast/group key encrypt key KK; the access point generates group key GK, and sets, according to the system status, multicast data serial number SN and group key notification serial number GN, and then sends to the user terminal the serial numbers together with the access point's security index $SPI_{AP}$, multicast data serial number SN, group key notification serial number Gn and their HMAC value as the key_negotiation_response message.

Figure 4:
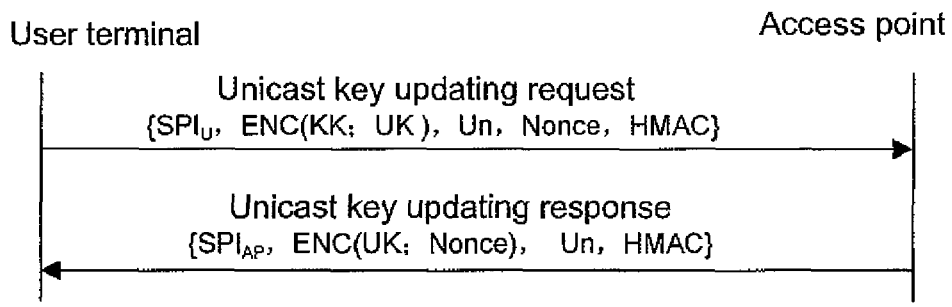
FIG. 4 is a view showing the unicast key updating process of the present invention.
Figure 5:
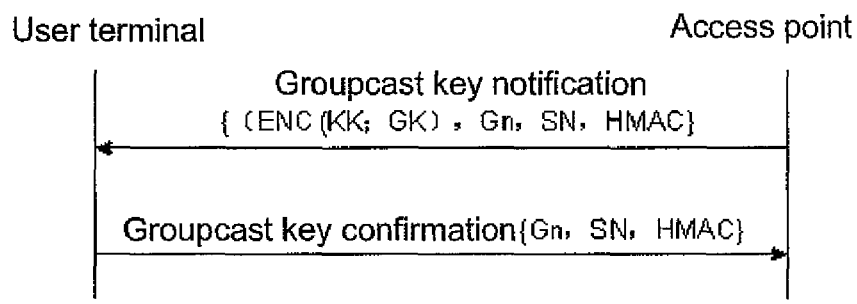
FIG. 5 is a view showing the group key notification process of the present invention.

2.4) After receiving the message, the user terminal checks whether $SPI_{AP}$ and $SPI_U$ are consistent or not. If they are, it uses the key to generate function $f(N_{KEY}, N1, SPI_u,$ "lexical string") to compute every key, including data unicast key UK, HMAC key and the unicast/group key encrypt key KK; after it is verified that the correct HMAC value is received, uses the unicast/group key encrypt key KK for decryption to obtain the group key GK, and then sends to the access point the user terminal's security index $SPI_u$, multicast data serial number SN, group key notification serial number Gn and their HMAC value as the key_negotiation_confirmation message. The user terminal opens the controlled port, and allows communication with the access point;

2.5) After receiving the message, the access point checks whether $SPI_{AP}$ and $SPI_U$ are consistent or not. If they are, then checks that the multicast data serial number SN, group key notification serial number Gn and HMAC value are correct, and, after that, opens the controlled port, and allows communication with the user terminal;

3. The user terminal and access point perform the unicast key updating process. The unicast key updating process may be initiated by the user terminal or access point. The key used for computing HMAC value in the process is the HMAC key obtained from the key negotiation process, the key used for the unicast/group key encryption is the unicast/group key encryption key KK obtained from the key negotiation process. See FIG. 4 for the specific details as follows:

3.1) The user terminal initiates unicast key updating. It produces the new unicast key UK, produces the random number as challenge Nonce, chooses a fresh unicast key updating serial number Un, uses unicast/group key encryption key KK to encrypt key UK, and passes it onto the access point together with the user terminal's security index $SPI_U$, encrypted unicast key UK, unicast key updating serial number Un, challenge Nonce and their HMAC value as the unicast key_updating_request message;

3.2) After receiving the message, the access point checks whether $SPI_{AP}$ and SPIu are consistent or not, if they are, decrypts, after verifying that the unicast key updating serial number Un is fresh and the HMAC value correct, to obtain new unicast key UK, then uses the new unicast key UK to encrypt challenge Nonce; and sends it to the user terminal together with the access point's security index $SPI_{AP}$, unicast key updating serial number Un and their HMAC value as the unicast key_updating_response message;

3.3) The user terminal installs new unicast key: after receiving the message, the user terminal checks whether $SPI_{AP}$ and $SPI_U$ are consistent or not, it they are, verifies that the unicast key updating serial number Un is identical with the value it sends out, and after verifying that the HMAC is correct, decrypts to obtain Nonce, makes comparison to find out whether said Nonce is consistent with the Nonce it sends out in the unicast key_updating_request message, if it is, the user terminal then installs a new unicast key; if any said comparison or verification fails to pass, repeats the unicast key updating process.

4. The user terminal and access point performs the process of group key notification. The key used for computing HMAC value in the process is the HMAC key obtained from the key negotiation process, and the key used for the unicast/group key encryption is the unicast/group key encryption key KK obtained from the key negotiation process. See FIG. 4 for the specific details as follows:

4.1) The access point produces a new group cast key GK, sets, according to the status of the system, the multicast data serial number SN and fresh group key notification serial number Gn, uses unicast/group key encryption key KK_to encrypt the group key GK, and sends it to the user terminal together with the multicast data serial number SN, group key notification serial number Gn and their HMAC value as the group_key_notification message;

4.2) After receiving the message, the user terminal verifies whether the group key notification serial number Gn is fresh and the HMAC value correct, then uses unicast/group key encryption key KK for decryption to obtain new group key GK and installs group key GK and sends to the access point the multicast data serial number SN, group key notification serial number Gn and their HAMC value as the group_key_confirmation message;

4.3) After receiving the message, the access point verifies whether the group key notification serial number Gn and the multicast data serial number SN are consistent with what is sends out itself, and if they are, it verifies that the HMAC value is correct, then the notification process is over.

In the method of the present invention, the authentication process, key negotiation process, unicast key updating process and group key notification process performed between the user terminal and access point are mutually independent. Of them, the authentication process is one that must be completed; the remaining three processes are optional, and performed only after the authentication process. Besides, the unicast key updating process and the group key notification process must be performed after the key negotiation process is completed, and there is no sequential requirement for the two processes.

The technical terms of the present invention are explained as follows:

ADSL Asymmetric digital subscriber loop (line)
HomePNA Home phone line network alliance
Cable Modem Cable modem
VDSL Very high speed digital subscriber loop
PPPoE Point-to-point Protocol over the Ethernet
Web/portal Web-browser/portal
802.1x Port-based access control protocol
AP Access point
The technical symbols of the present invention are defined as follows:
$AUTH_{Type}$ Type of authentication methods
$Key_{Type}$ Type of key negotiation methods
$N_{CH}$ Authentication challenge
Nu Random number of user terminal for verifying certificate of access point
$N_{AP}$ Random number of access point for verifying certificate of user terminal
$Cert_U$ Public-key certificate of user terminal
$Cert_{AP}$ Public-key certificate of access point
$RES_U$ User terminal certificate verification result
$RES_{AP}$ certificate verification result of the access point
$ATT_U$ Attributes of user terminal
$ATT_{AP}$ Attributes of access point
$Sig_U$ Signature of user terminal
$Sig_{AP}$ Signature of access point
$Sig_{F-AS}$ Authentication server of access point
$Sig_{H-AS}$ Authentication server of user terminal
$ENC_{AP}$ ( ) Public-key encryption using access point
ENC (key;) Symmetric key algebra encryption using key
SPI Security index
$N_{KEY}$ Random shared secrete
N1 Random number
Nonce Random number
SN Multicast data serial number
$G_N$ Group key serial number
HMAC Hybrid function with the key
(,,, Sig) "Sig" refers to signature on other contents in the brackets
Un unicast key serial number
GK group key
UK unicast key
KK unicast/group key encryption key
$SPI_U$ Security index of user terminal
$SPI_{AP}$ Security index of access point Although an embodiment of this invention has been disclosed, a worker of ordinary skill in this art would recognize that certain modifications would come within the scope of this invention. For that reason, the following claims should be studied to determine the true scope and content of this invention.

We claim:

1. An access authentication method suitable for wired and wireless networks, comprising the following steps:
   1) establishing a security channel between an authentication server of an access point and an authentication server of a user terminal to protect messages;
   2) performing a process of authentication at the user terminal and the access point, and completing a mutual identity authentication of the user terminal and the access point after said security channel is pre-established wherein:
   2.1) the access point sends an authentication_activating message: the access point sends to the user terminal the authentication_activating message containing authentication challenge $N_{CH}$;
   2.2) the user terminal sends the authentication server of the user terminal a request message specifically as follows:
   2.2.1) the user terminal sends an access_authentication_request message: after receiving the authentication_activating message, the user terminal sends the access point the access_authentication_request message containing authentication challenge $N_{CH}$ which the user terminal has received, user terminal certificate $Cert_u$, and the user terminal random number Nu, and the user terminal's signature, wherein signed data of the user terminal's signature contains the $N_{CH}$, the $Cert_u$ and the $N_u$;
   2.2.2) the access point sends an identification_request message: after the access point receives the access_authentication_request message, if the authentication challenge $N_{CH}$ it has received and the authentication challenge $N_{CH}$ it has sent out are identical and the signature is correct upon checking according to the certificate of the user terminal, the access point then sends the authentication server of the access point the identification_request message containing the certificate $Cert_u$ of the user terminal, certificate $Cert_{AP}$ of the access point, and the random number $N_{AP}$ of the access point, the user terminal random number $N_u$, and a signature of the access point, wherein signed data of the signature of the access point contains the $Cert_u$, the $Cert_{AP}$, the $N_{AP}$ and the $N_u$; if the authentication challenge $N_{CH}$ it has received and the authentication challenge $N_{CH}$ it has sent out are not identical, the access point stops the authentication process;
   2.2.3) the authentication server of the access point sends a roaming_identification_request message: after receiving the identification_request message, the authentication server of the access point checks the signature of the access point according to the certificate of the access point, constructs, according to the check result, an initial certificate check result $RES_{AP}$ of the access point, said initial certificate check result includes the certificate of the access point and associated valid status information of the access point certificate; the authentication server of the access point determines, according to the certificate of the user terminal, a location of the authentication server of the user terminal, constructs and sends to the authentication server of the user terminal the roaming_identification_request message containing the initial certificate check result of the access point, random number $N_u$ of the user terminal, and certificate $Cert_u$ of the user terminal;
   2.3) the authentication server of the user terminal sends the user terminal response message, wherein:
   2.3.1) the authentication server of the user terminal sends a roaming_identification_response message: after receiving the roaming_identification_request message, the authentication server of an user terminal checks the certificate of the user terminal, constructs, according to the check result, the user terminal's initial certificate check result $RES_u$ including the certificate of the user terminal and associated valid status information of the user terminal certificate; then generates the access point's final certificate check result including the initial certificate check result $RES_u$ of the user terminal, the initial certificate check result $RES_{AP}$ of the access point, random number Nu of the user terminal and the signature $Sig_{H\text{-}AS}$ on said content by the authentication server of user terminal; the authentication server of the user terminal constructs and sends to the authentication server of the access point the roaming_identification_response message including the initial certificate check result of the user terminal, attribute of the user terminal, and the final certificate check result of the access point;
   2.3.2) the authentication server of access point sends the identification_response message: after receiving the roaming_identification_response message, the authentication server of the access point generates an user terminal's final certificate check result including the user terminal's initial certificate check result $RES_u$, access point's initial certificate check result $RES_{AP}$, the access point's random number $N_{AP}$ and the signature $Sig_{F\text{-}AS}$ of the authentication server of the access point on said contents; the authentication server of the access point constructs and sends to the access point the identification_response message containing the final certificate check result of the user terminal and the final certificate check result of the access point;
   2.3.3) the access point sends the authentication_response message: after receiving the identification_response message, the access point sends the user terminal the authentication_response message containing the final certificate check result of the access point; it then checks the final certificate check result of the user terminal, if the final certificate check result of the user terminal is legitimate, the access point continues to carry on the next-step communication with the user terminal; otherwise, the access point stops the authentication process; and
   2.4) authentication is completed and the user terminal continues to carry on the next step communication with the access point after the user terminal receives the authentication_response message in response to a legitimate final certificate check result of the access point; otherwise, the user terminal stops the authentication process.

2. The access authentication method suitable for wired and wireless networks according to claim 1, wherein said steps of authentication by the user terminal and access point include a method to determine the key negotiation between the two, wherein
   1) the authentication_activating message that the access point sends to the user terminal contains the type of key negotiation method supported by the access point;
   2) the access_authentication_request message which the user terminal sends to the access point contains the type of key negotiation method chosen by the user terminal, and the chosen type is signed by the user terminal.

3. The access authentication method suitable for wired and wireless networks according to claim 2, wherein said method includes the process of key negotiation between the user terminal and access point after the authentication process is completed 1) the access point sends key_negotiation_challenge message: the access point generates, according to the identity of the user terminal and access point, the security index $SPI_{AP}$ of the access point, and simultaneously generates random number N1, and sends to the user terminal the key_negotiation challenge message containing the security index $SPI_{AP}$ and the random number N1;
2) the user terminal sends key_negotiation_request message and after receiving the key_negotiation_challenge message, the user terminal generates, according to the identity of the user terminal and access point, security index SPIu, and then checks whether $SPI_{AP}$ and $SPI_U$ are consistent or not; if there is a consistency, the user terminal generates a random number $N_{KEY}$ as the shared secret, and uses public key encryption $N_{KEY}$ of the access point to generate the key negotiation information; the user terminal then constructs and sends to the access point the key_negotiation_request message containing the user terminal's security index $SPI_U$, key negotiation information, random number N1 and user terminal's signature on said information;
3) the access point sends key_negotiation_response message and after receiving the key_negotiation_request message, the access point verifies that the user terminal's signature is correct, then uses the access point's private key for decryption to obtain $N_{KEY}$; checks whether $SPI_{AP}$ and $SPI_U$ are consistent or not and whether the received random number N1 and that it sends in the key_negotiation_challenge message are consistent or not; if there is consistency, the access uses the key to generate function f($N_{KEY}$, N1, $SPI_{AP}$, "lexical string") to compute every key, including the data unicast key UK, HMAC key and the unicast/group key encryption key KK; the access point generates group key GK, set, according to the system status, multicast data serial number SN and group key notification serial number GN, and then the access point uses unicast/group key encryption key KK to encrypt group key GK, and sends it to the user terminal together with the access point's security index $SPI_{AP}$, multicast data serial number SN, group key notification serial number Gn, and their HMAC value as the key_negotiation_response message;
4) the user terminal sends key_negotiation_confirmation message and after receiving the message, the user terminal checks whether $SPI_{AP}$ and $SPI_U$ are consistent or not. If they are, it uses the key to generate function f ($N_{KEY}$, N1, $SPI_U$, "lexical string") to compute every key, including the data unicast key UK, HMAC key and the unicast/group key encryption key KK; after it is verified that the correct HMAC value is received, uses the unicast/group key encryption key KK for decryption to obtain the group key GK, and then sends to the access point the user terminal's security index $SPI_U$, multicast data serial number SN, group key notification serial number Gn, and their HMAC value as the key negotiation confirmation message; the user terminal then opens the controlled port, and allows communication with the access point;
5) the key negotiation is completed and after receiving the message, the access point checks whether $SPI_{AP}$ and $SPI_U$ are consistent or not; if there is consistency, the access point then checks that the multicast data serial number SN, group key notification serial number Gn and HMAC value are correct, then opens the controlled port, and allows communication with the user terminal.

4. The access authentication method suitable for wired and wireless networks according to claim 3, wherein said method includes the process of updating unicast key performed by the user terminal and access point, wherein:

1) the user terminal sends unicast key_updating_request message and the user terminal initiates unicast key updating to produce a new unicast key UK and a random number as a challenge Nonce, chooses a fresh unicast key updating serial number Un, uses unicast/group key encryption key KK to encrypt UK, and transmits the UK onto the access point together with the user terminal's security index $SPI_U$, encrypted unicast key UK, unicast key updating serial number Un, challenge Nonce and the HMAC value as the unicast key_updating_request message;
2) the access point sends unicast key_updating_response message and after receiving the message, the access point checks whether $SPI_{AP}$ and SPIu are consistent or not; if there is consistency, the access point decrypts, after verifying that the unicast key updating serial number Un is fresh and the HMAC value correct, to obtain a new unicast key UK, then uses the new unicast key UK to encrypts the challenge Nonce; and sends the challenge Nonce to the user terminal together with the access point's security index $SPI_{AP}$, unicast key updating serial number Un and their HMAC value as the unicast key_updating_response message;
3) the user terminal installs new unicast key and after receiving the message, the user terminal checks whether $SPI_{AP}$ and $SPI_U$ are consistent or not, if there is consistency, the user terminal verifies that the unicast key updating serial number Un is identical with the value it sends, and decrypts, after verifying that the HMAC value is correct, to obtain the challenge Nonce, makes comparison to find out whether said challenge Nonce is consistent with the challenge Nonce it sends in the unicast key_updating_request message; if there is consistency the user terminal then installs a new unicast key; and if any said comparison or verification fails to pass, it repeats the unicast key updating process.

5. The access authentication method suitable for wired and wireless networks according to claim 4, wherein said unicast key updating can be initiated by the access point.

6. The access authentication method suitable for wired and wireless networks according to claim 5, wherein said method includes the group key notification process performed by the user terminal and access point, wherein:

1) the access point sends group_key_notification_message and access point produces a new group key GK, sets, according to the status of the system, the multicast data serial number SN and a fresh group key notification serial number Gn, uses unicast/group key encryption key KK to encrypt the group key GK, and sends it to the user terminal together with multicast data serial number SN, group key notification serial number Gn, and the HMAC value as the group_key_notification message;
2) the user terminal sends group_key_confirmation message and after receiving the message, the user terminal verifies whether the group key notification serial number Gn is fresh and the HMAC value correct, then uses unicast/group key encryption key KK for decryption to obtain the new group key and installs group key GK, and sends to the access point the multicast data serial number SN, group key notification serial number Gn, and the HAMC value as the group_key_confirmation message;

3) the group key notification is completed and after receiving the message, the access point verifies whether the group key notification serial number Gn and multicast data serial number SN are consistent with what it sends itself; if they are and if the HMAC value is verified to be correct, the notification is completed.

7. The access authentication method suitable for wired and wireless networks according to claim 1, wherein said steps of authentication by the user terminal and the access point include:
  1) the authentication_activating message which the access point sends to the user terminal contains the types of authentication methods supported by the access points;
  2) the access_authentication_request message which the user terminal sends to the access point contains the types of authentication methods chosen by the user terminal and;
  3) said identification_request message, roaming_identification_request message, roaming_identification_response message, identification_response message and authentication_response message all contain the types of authentication methods chosen by the user terminal.

8. The access authentication method suitable for wired and wireless networks according to claim 7, wherein said roaming_identification_request message includes the attributes $ATT_{AP}$ of the access point; said roaming_identification_response message includes the attributes ATTu of the user terminal; said final certificate check results of the access point include the user terminal's initial certificate check result RESu, access point's initial certificate check result $RES_{AP}$, user terminal's random number Nu, access point's attribute $ATT_{AP}$ and the signature $Sig_{H-AS}$ on said contents by the authentication server of the user terminal; said final certificate check results of the user terminal include the user terminal's initial certificate check result RESu, access point's initial certificate check result $RES_{AP}$, access point's random number $N_{AP}$, user terminal's attribute ATTu, and the signature $Sig_{F-AS}$ on said contents by the authentication server of the access point.

* * * * *

UNITED STATES PATENT AND TRADEMARK OFFICE
CERTIFICATE OF CORRECTION

PATENT NO. : 8,225,092 B2  
APPLICATION NO. : 11/816743  
DATED : July 17, 2012  
INVENTOR(S) : Xiaolong Lai It is certified that error appears in the above-identified patent and that said Letters Patent is hereby corrected as shown below:

ON THE TITLE PAGE:

Items 12 and 75 Inventor Lai's information should read as follows:

--Xiaolong Lai, Xi'an (CN)--

Signed and Sealed this
Twenty-seventh Day of November, 2012

David J. Kappos
*Director of the United States Patent and Trademark Office*